United States Patent [19]
Tashima et al.

[11] Patent Number: 6,016,541
[45] Date of Patent: Jan. 18, 2000

[54] INSTRUCTION CONTROLLING SYSTEM AND METHOD THEREOF

[75] Inventors: Kyoko Tashima; Takeo Asakawa; Aiichiro Inoue, all of Kawasaki, Japan

[73] Assignee: Fujitsu Limited, Kawasaki, Japan

[21] Appl. No.: 09/042,797

[22] Filed: Mar. 17, 1998

[30] Foreign Application Priority Data

Oct. 2, 1997 [JP] Japan .................................. 9-269702

[51] Int. Cl.[7] ................................................ G06F 15/00
[52] U.S. Cl. ............................................ 712/217; 712/23
[58] Field of Search .............................. 712/23, 217, 216, 712/218, 215

[56] References Cited

U.S. PATENT DOCUMENTS

| | | | |
|---|---|---|---|
| 4,992,938 | 2/1991 | Cocke et al. | 712/217 |
| 5,560,032 | 9/1996 | Nguyen et al. | 712/23 |
| 5,625,789 | 4/1997 | Hesson et al. | 712/217 |
| 5,694,564 | 12/1997 | Alsup et al. | 712/216 |
| 5,708,837 | 1/1998 | Handlogten | 712/23 |
| 5,809,276 | 9/1998 | Deosaran et al. | 712/217 |
| 5,872,950 | 2/1999 | Levitan et al. | 712/218 |
| 5,872,985 | 2/1999 | Kimura | 395/800.01 |
| 5,881,305 | 3/1999 | Walker | 712/23 |
| 5,884,061 | 3/1999 | Hesson et al. | 712/217 |

FOREIGN PATENT DOCUMENTS 2-7129 1/1990 Japan .
5-307483 11/1993 Japan .

*Primary Examiner*—Larry D. Donaghue
*Attorney, Agent, or Firm*—Staas & Halsey LLP

[57] ABSTRACT

A general-purpose register address output from an instruction register is read and changed to a corresponding register update buffer address in an update table. Additionally, the update reservation instructing bit corresponding to the general-purpose register address is read out from a register update reservation table. If its value is "0", the general-purpose register address is provided to the general-purpose register, and the data stored at that address is input to an arithmetic unit. If the value of the bit is "1", the contents of the corresponding entry in the update table is registered to a reservation station. The reservation station determines the execution order of respective entries, and sequentially provides a register update buffer address to a register update buffer, and inputs the data stored at that address to the arithmetic unit.

7 Claims, 9 Drawing Sheets

FIG. 5A

UPDATE TABLE 22

| | REGISTER UPDATE BUFFER ADDRESS | UPDATE RESERVATION INSTRUCTING BIT | |
|---|---|---|---|
| 0 | | | |
| 1 | | | |
| ... | | ... | |
| 15 | | | |

UPDATE BUFFER ADDRESS TABLE 29     REGISTER UPDATE RESERVATION TABLE 28

FIG. 5B

RESERVATION STATION 33

| | GENERAL-PURPOSE REGISTER ADDRESS | REGISTER UPDATE BUFFER ADDRESS | UPDATE RESERVATION INSTRUCTING BIT |
|---|---|---|---|
| 0 | | | |
| ... | ... | ... | ... |
| 7 | | | |

INSTRUCTION CONTROLLING SYSTEM AND METHOD THEREOF

BACKGROUND OF THE INVENTION

1. Field of the Invention

The present invention relates to an instruction controlling system for allowing out-of-order instruction execution in order to quickly execute instructions in an information processing device and a method thereof.

2. Description of the Related Art

The out-of-order instruction execution method is a method for sequentially executing instructions starting from an instruction whose input data has been provided in an order different from the instruction order directed by a program. The instructions are executed in an arbitrary order, but the resources that can be accessed by the program, such as a storage area, contents of registers, etc. must be updated and referenced in the order directed by the program.

As a technique for ensuring that the contents of registers are updated and referenced in the order directed by the program, a technique for renaming a register can be cited. With a conventional register renaming technique, physical registers whose number is larger than that of logical registers designated according to an architecture are prepared, and the contents of all of the logical registers are mapped to the physical registers, and updated and referenced. The reason why the physical registers whose number is larger than that of the logical registers are arranged is to maintain a physical register corresponding to a logical register even if a pipeline is cleared due to some cause.

FIG. 1 is a schematic diagram showing a conventional register renaming technique.

A register renaming table 901 includes entries whose number is equal to that of logical registers, and each of the entries stores a physical register number corresponding to a logical register number. In FIG. 1, a "D" cycle indicates decoding of an instruction; an "A" cycle indicates an address calculation of a main storage operand; a "T" cycle indicates address conversion; a "B" cycle indicates a read operation of the operand; an "E" cycle indicates arithmetic operation execution; a "C" cycle indicates a checking operation; and a "W" cycle indicates a storage operation of an arithmetic operation result.

FIG. 1 shows the case in which two LOAD instructions interfere with a register (perform processes for an identical physical register address). When the initial LOAD instruction is issued, a logical register address is output from an instruction register 900. In FIG. 1, "R" indicates the logical register address in the instruction register 900. When the logical register address is output from the instruction register 900, the register renaming table 901 is referenced and the physical register address corresponding to the logical register address output from the instruction register 900 is output. When the physical register address is output, the corresponding data is loaded into the physical register storing the physical register address in a physical register file 902 on the "C" cycle and the "W" cycle.

Suppose that the second LOAD instruction is issued after the first LOAD instruction. The second LOAD instruction is an instruction which uses the data written to the physical register with the first LOAD instruction, and causes register interference. When the second LOAD instruction is issued, the logical address is output from the instruction register 900 and converted into a physical register address. This physical register address is the same as that output with the first LOAD instruction. Then, the data is extracted from the physical register in the physical register file 902, and input to an arithmetic unit 903.

According to FIG. 1, the physical register cannot be referenced and read out unless logical register addresses are converted into physical register addresses. As referred to in the explanation about the conventional technique, physical registers (a physical register file) whose number is larger than that of logical registers are prepared in the register renaming technique so as to ensure the update and reference operations in the order directed by a program according to the out-of-order method. Additionally, since the physical registers are used in various processes, the numbers of their entries are large. Accordingly, the number of stages of the physical registers is large. Additionally, both the number of stages of selectors required for reading the data corresponding to the physical registers, and the number of logic circuits for transmitting and receiving the data are large. If the numbers of stages of physical registers and their peripheral logic circuits are large as described above, a data read operation requires a considerable amount of time. As a result, one machine cycle time must be extended. Accordingly, if the renaming table 901 is accessed, a physical register is accessed, the contents of the physical register is read out, and an instruction is transmitted to an arithmetic unit during the instruction decoding cycle, the machine cycle can be possibly delayed. For example, the period of the "D" cycle of the second LOAD instruction becomes 1.5 times the other cycles in FIG. 1.

If a cycle for renaming a register is newly arranged in order to avoid the above described problem, two extra cycles are always required from the instruction decoding cycle to the arithmetic operation execution cycle, which also leads to the degradation of performance.

As described above, the register renaming technique shown in FIG. 1 has the problems that the machine cycle becomes longer (the delay of the machine cycle), the number of cycles until the execution of an arithmetic operation increases, etc., which impede the speed-up of an arithmetic operation.

SUMMARY OF THE INVENTION

An object of the present invention is to provide an instruction controlling system for allowing an instruction to be quickly executed in an out-of-order instruction controlling system.

The instruction controlling system according to the present invention is an instruction controlling system for performing out-of-order instruction control. This system comprises a register unit for registering data used for executing an instruction; an instruction register unit for outputting a logical address in the register unit, which is used for executing the instruction; a decoding unit for decoding the logical address output from the instruction register unit; a register update buffer unit for temporarily storing the data to be registered to the register unit; an update table unit for registering an address in the register update buffer unit, to which the data for updating the register unit is registered, and an update reservation instructing bit for indicating whether or not an update operation of the contents of the corresponding address in the register unit according to the data registered to the register update buffer unit is reserved, in correspondence with the address in the register unit; and a reservation station unit for registering the address in the register unit, the address in the register update buffer unit, and the update reservation instructing bit by making a correspondence between them, assigning priorities for executing corresponding instructions to the entries corresponding to the contents of each registration, and transmitting the addresses of data to be processed to the register update buffer unit based on the assigned priorities, if the contents of the address in the register unit is not updated. This system is characterized in that the update reservation instructing bit in the update table unit, which corresponds to the address output from the instruction register unit, is referenced when executing an instruction; an arithmetic operation is performed by using the data registered to the register unit if the register unit is updated; and the arithmetic operation is performed by using the data stored in the register update buffer unit if the register unit is not updated.

An instruction controlling method according to the present invention is a method for performing out-of-order instruction control. A register for registering data to be used for executing an instruction, and a register update buffer for temporarily storing the data to be registered to the register are arranged for implementing this method, which comprises the steps of: (a) registering the address in the register update buffer, to which the data for updating the register is registered, and the update reservation instructing bit indicating whether or not the update operation of the contents of the corresponding address in the register according to the data registered to the register update buffer is reserved, in correspondence with the address in the register; (b) registering the address in the register, the address in the register update buffer, and the update reservation instructing it by making a correspondence between them, assigning priorities for executing corresponding instructions to the entries corresponding to the contents of each registration, and transmitting the addresses at which the data to be processed is stored to the register update buffer based on the assigned priorities, if the contents of the address in the register is not updated; and (c) referencing the update reservation instructing bit corresponding to the address output when an instruction is executed, performing an arithmetic operation by using the data registered to the register if the register is updated, and performing the arithmetic operation by using the data stored in the register update buffer if the register is not updated.

The instruction controlling system and the instruction controlling method according to the present invention eliminate the conventional need for performing the process for renaming a logical address a physical address, and accessing a physical register in an information processing device employing an out-of-order mechanism. Accordingly, the number of logic stages of the instruction controlling system can be reduced, thereby simplifying an instruction control process. Consequently, the execution speed of circuitry of the instruction controlling system can be improved and the frequency of machine cycles can be raised. The processing speed of the information processing device employing the instruction controlling system or the instruction controlling method according to the present invention can be therefore improved.

BRIEF DESCRIPTION OF THE DRAWINGS

FIGS. 5A and 5B show the structures of an update table and a reservation station;

DESCRIPTION OF THE PREFERRED EMBODIMENTS

Figure 2:
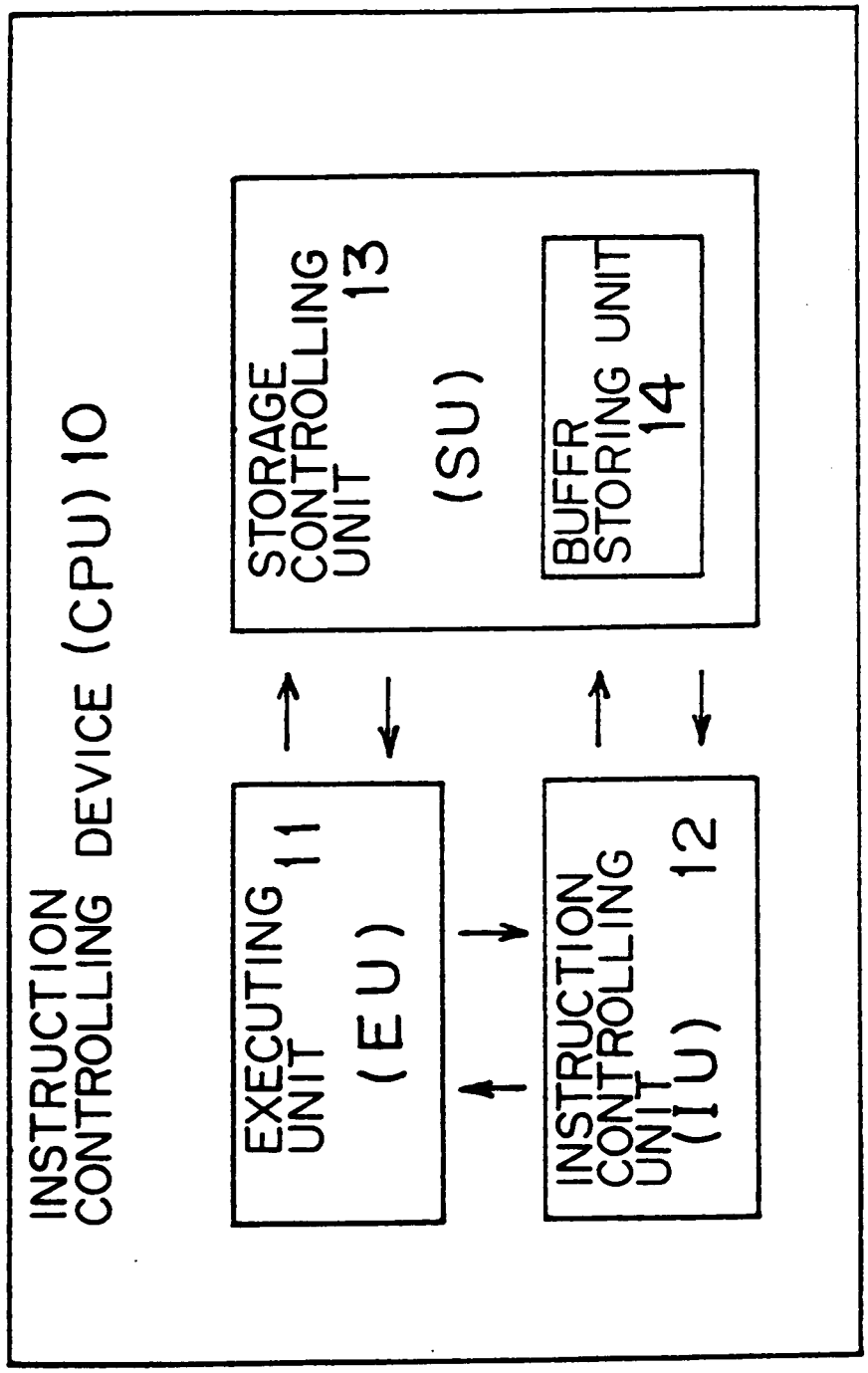
FIG. 2 is a block diagram showing the outline of an instruction controlling device according to an embodiment of the present invention.

FIG. 2 is a block diagram showing the outline of an instruction controlling device 10 according to an embodiment of the present invention. The instruction controlling device (CPU) 10 is composed of an executing unit (EU) 11, an instruction controlling unit (IU) 12, and a storage controlling unit (SU) 13. The storage controlling unit 13 includes a buffer storing unit 14. The executing unit 11 is intended for performing operations such as an arithmetic operation, a logical operation, an address calculation, etc. The storage controlling unit 13 is intended for storing the data obtained by the operations performed by the execution unit 11. The instruction controlling unit 12 is intended for controlling an execution of program instructions. This unit controls the process for making the storage controlling unit 13 transmit necessary data to the executing unit 11, and the process for making the storage controlling unit 13 store the results of operations performed by the executing unit 11. At the same time, the instruction controlling unit 12 controls the execution order of instructions for the out-of-order method. The buffer storing unit 14 included in the storage controlling unit 13 temporarily stores the data of an intermediate result of the operations performed by the executing unit 11, and the data of the result processed with the out-of-order method in a correct order so that these data are written to the storage controlling unit 13. The executing unit 11, the instruction controlling unit 12, and the storage controlling unit 13 are connected via lines for exchanging information, which are not shown in this figure.

According to this embodiment, a plurality of register update buffers for temporarily storing a result of an instruction execution and updating a general-purpose register upon completion of the instruction execution are newly arranged, and instructions are executed without delaying machine cycles, and without using the conventional register renaming technique.

Figure 3:
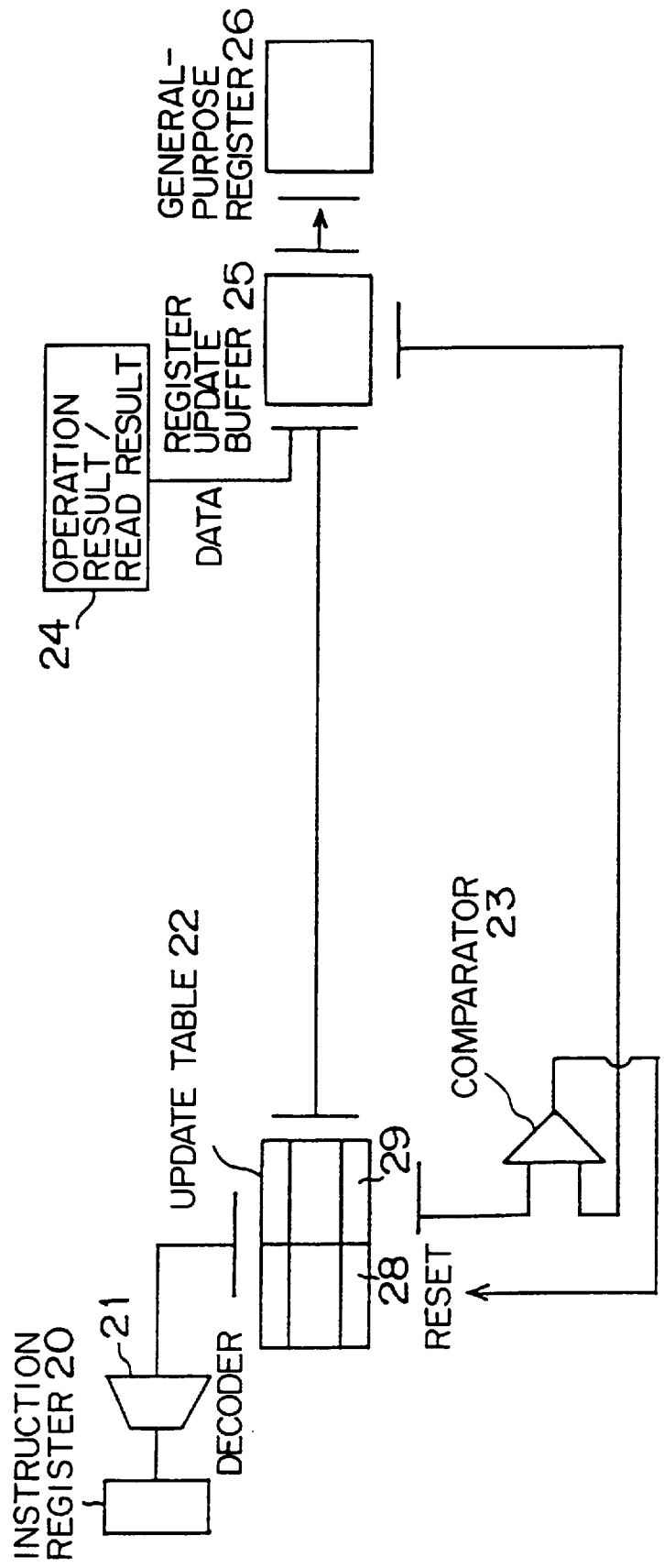
FIG. 3 is a schematic diagram showing part of the configuration according to the embodiment of the present invention, and explaining the operations performed when a general-purpose register is updated.

FIG. 3 is a schematic diagram showing part of the configuration according to this embodiment of the present invention, and explaining the operations performed when a general-purpose register is updated.

According to this embodiment, a newly arranged update table 22 and a register update buffer 25 are used when a general-purpose register 26 is updated. The update table 22 is composed of an update buffer address table to which addresses of a plurality of register update buffers 25 are registered; an update reservation table 28 for registering the update reservation instructing bit, which is arranged for each of the addresses in the plurality of register update buffers 25, and indicates whether or not the update operation of the general-purpose register according to the data at the corresponding address in the register update buffer 25 is reserved; and an address in the general-purpose register 26, which is corresponded to an entry of the update buffer address table 29 and the register update reservation table 28.

In this embodiment, a plurality of register update buffers 25 (represented by a single block in FIG. 3) are arranged and used to temporarily store the result of an instruction execution when the instruction is executed, and to store the result of the instruction execution in the general-purpose register 26 upon completion of the instruction execution.

When a program instruction to be executed by the instruction controlling device 10 shown in FIG. 2 is fetched from a memory not shown in this figure and stored in an instruction register 20 in the instruction controlling device 10, a logical address in the general-purpose register 26 is output from the instruction register 20 to a decoder 21. This address is decoded by the decoder 21, so that the register update reservation table 28 is updated. The update buffer address table 29 is a table for storing an update buffer address indicating in which register update buffer 25 (or at which address of the register update buffer 25) the data updating the general-purpose register 26 is stored in correspondence with the number (or the address) of the general-purpose register 26. This table is generated beforehand and stored in a memory, etc. The register update reservation table is a table for storing the update reservation instructing bit indicating that the update operation of the general-purpose register 26 is reserved in correspondence with the number (or the address) of the general-purpose register 26.

The physical address of the general-purpose register 26 obtained as a result of decoding performed by the decoder 21 is compared with the general-purpose register address in the update table 22, or with each entry of the number of the general-purpose register 26. Then, the corresponding entry is searched, converted into the corresponding address of the register update buffer 25 in the update buffer address table 29, and provided to the register update buffer 25. Furthermore, the update reservation instructing bit of the entry in the register update reservation table 28, which corresponds to the physical address in the general-purpose register 26 transmitted from the decoder 21, is sets to "1". The bit value "1" indicates that the update operation of the general-purpose register 26 is reserved. The register update buffer 25 which receives the address of the update buffer 25 from the update table 22 receives the result of the operation or the result of the read operation 24 from the executing unit 11 or the storage controlling unit 13 (refer to FIG. 2), and stores this data 24 at the corresponding address.

Next, assume that the instruction for writing the contents of the register update buffer 25 to the general-purpose register 26 (the instruction for updating the general-purpose register 26) is fetched and stored in the instruction register 20. In this case, the logical address in the general-purpose register 26 is output from the instruction register 20, decoded by the decoder 21, converted into a physical address, and provided to the update table 22. In the update table 22, the update buffer address in the register update buffer 25 is obtained from the physical address in the general-purpose register 26, which is transmitted from the decoder 21, and provided to the register update buffer 25. Then, the contents of the corresponding address (update buffer address) are written to the general-purpose register 26 by the register update buffer 25.

At this time, the update buffer address used for performing the write to the general-purpose register 26 is output from the register update buffer 25, and transmitted to a comparator 23. In the comparator 23, the comparison between each address in the update buffer address table 29 and the address transmitted from the register update buffer 25 is made. If a matching address is found, the value of the update reservation instructing bit in the register update reservation table 28, which corresponds to that address, is reset to "0".

The address comparison in the update table 22, which is shown in FIG. 3, is made by using hardware, and the physical address corresponding to the logical address is output from the update table 22. Therefore, there is no need to perform a rename operation like the conventional technique. Furthermore, data is read not from the general-purpose register (physical register) with a large number of stages, but from the register update buffer with a small number of stages according to the present invention. As a result, the numbers of logic stages of selectors, logical circuits for exchanging data, etc. decrease, so that the frequency of machine cycles can be raised, and the execution time at each stage of a pipeline can be shortened. That is, the processing speed of the instruction controlling device 10 can be improved.

Figure 4:
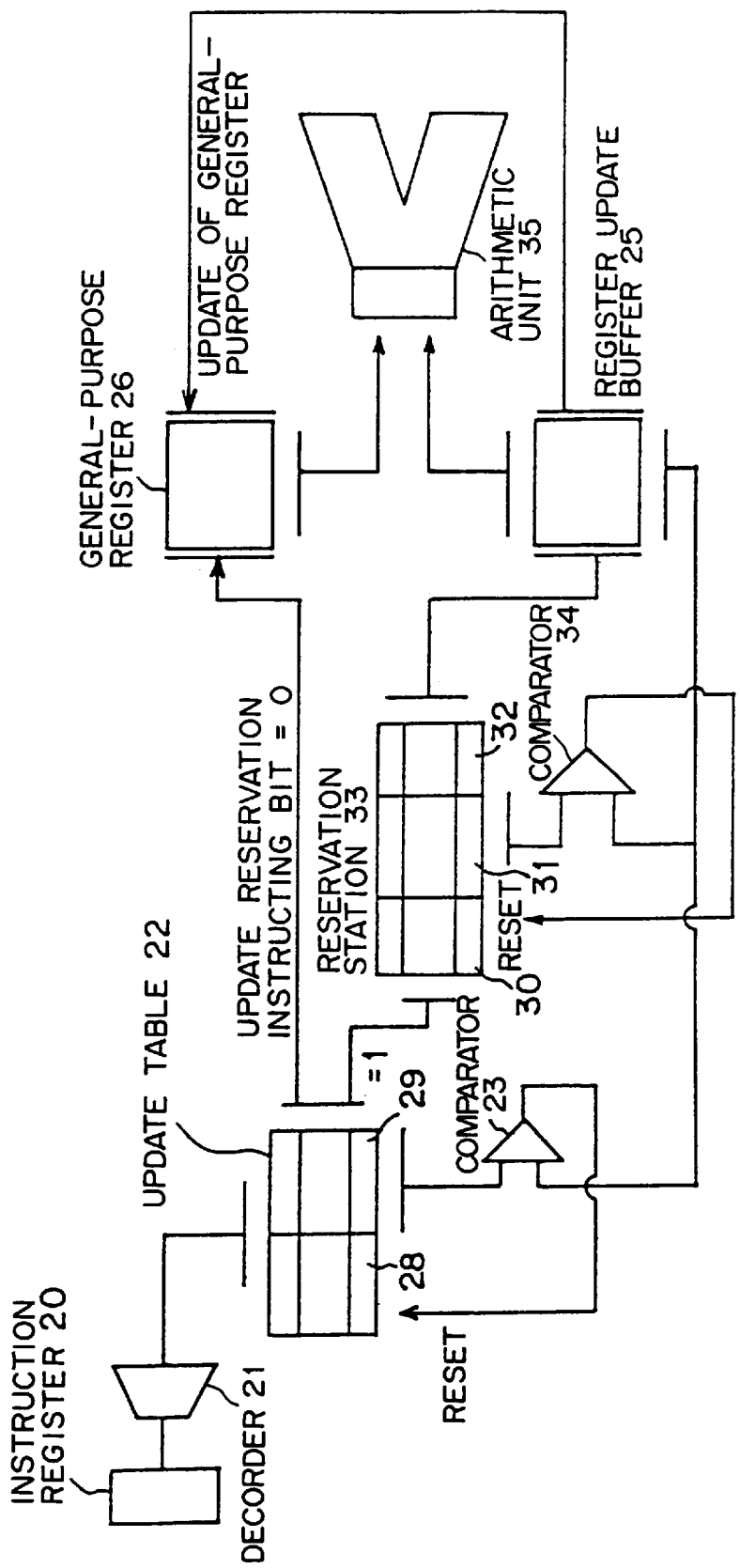
FIG. 4 is a schematic diagram showing part of the configuration according to the embodiment, and the configuration and operations when the contents of a register is read out.

FIG. 4 is a schematic diagram showing part of the configuration according to this embodiment. It shows the configuration and the operations performed when the contents of a register is read out.

According to this embodiment, a reservation station 33 for storing a general-purpose register address, a register update buffer address (the output of the update buffer address table 29) corresponding to the general-purpose register 26, and an update reservation instructing bit of the general-purpose register 26, is arranged in addition to the above described update table 22.

It is detected whether or not the update operation of the general-purpose register 26 which reads out data with an instruction is reserved with the preceding instruction by searching the update reservation table 28 when the instruction is decoded. If "NO", the data in the general-purpose register 26 is read out. Upon completion of decoding the instruction, it is transmitted to the executing unit (an arithmetic unit 35). If "YES", the general-purpose register address, the register update buffer address corresponding to the general-purpose register 26, and the update reservation instructing bit of the general-purpose register 26 are stored in the reservation station 33 when the instruction is decoded. The specified data in the register update buffer 25 is read out when the register update buffer 25 is made available, and the instruction is transmitted from the reservation station 33 to the executing unit 11.

With the above described mechanism, the out-of-order instruction execution can be performed without any machine cycle delay.

Additionally, the comparison between the address in the register update buffer 25, which provides the data for updating the general-purpose register 26, and all of the register update buffer addresses registered to the update buffer address table 29 is made upon completion of the execution of the instruction for updating the general-purpose register 26, and the update reservation instructing bit in the register update reservation table 28, which corresponds to a matching register update buffer address, is reset. As a result, the completion of the update operation of the general-purpose register 26 is directed.

Similarly, the comparison between the address of the register update buffer 25, which provides the data for updating the general-purpose register 26 and all of register update buffer addresses registered to the reservation station 33 is made upon completion of the execution of the instruction for updating the general-purpose register 26, and the update reservation instructing bit in the reservation station 33, which corresponds to a matching register update buffer address, is reset. Consequently, the completion of the update operation of a specified general-purpose register is directed.

When the instruction for reading a register is first issued, the logical address in the general-purpose register is output from the instruction register 20. The logical address is then decoded by the decoder 21. The entry in the register update reservation table 28, which corresponds to the decoded enteral-purpose register address is searched, and the entry in the register update reservation table 28, which corresponds to this address, is obtained. Next, the update reservation instructing bit is read from the entry in the register update reservation table 28. If the value of this bit is "0", the general-purpose register address corresponding to the general-purpose register 26 is provided, and the contents of the data corresponding to this address is input to the arithmetic unit 35. Since the value "0" indicates that the contents of the data in the general-purpose register 62 was previously updated. Therefore, the data is directly input from the general-purpose register 26 to the arithmetic unit 35.

If the value of the update reservation instructing bit in the register update reservation table 28, which corresponds to the physical address in the general-purpose register 26 output from the decoder 21, is "1", the address in the register update buffer 25 in the register update buffer address table 29, which corresponds to the reservation instructing bit, is output to the reservation station 33. In the reservation station 33, the update reservation instructing bit, the register update buffer address, and the general-purpose register address are respectively registered to the columns 30, 31, and 32 by making a correspondence between them, based on the information transmitted from the update table 22. In the reservation station 33, a priority is assigned to the execution order of the instruction for reading each register in consideration of the three items of registered information, etc., and starts executing the instruction whose data becomes complete. Accordingly, register update buffer addresses are output from the reservation station 33 to the register update buffer 25 in the order different from that of the addresses transmitted from the update table 22.

From the register update buffer 25, the data are read based on the register update buffer addresses transmitted form the reservation station 33, and input to the arithmetic unit 35. When the instruction for updating the general-purpose register 26 is issued, the register update buffer address which has been just input to the arithmetic unit 35 is transmitted from the register update buffer 25 to a comparator 34. From the reservation station 33, the register update buffer address in each entry in the column 31 is output, and transmitted to the comparator 34. If a matching register update buffer address is detected by the comparator 34, the value of the update reservation instructing bit corresponding to the address in the column 30 is reset from "1" to "0". The registration of the entry whose update reservation instructing bit is reset to "0" in the reservation station 33 is erased at suitable timing. Or, a validity flag indicating whether or not an entry is valid may be arranged for each entry in the reservation station 33. In this case, the validity flag is disabled if the update reservation instructing bit is reset.

At this time, the data of the corresponding register update buffer address is transmitted from the register update buffer 25 to the general-purpose register 26, so that the contents of the general-purpose register 26 is updated to this data, as referred to in the explanation of FIG. 3. Simultaneously, the register update buffer address output from the register update buffer 25 is input to the comparator 23, and compared with each address in the update buffer address table 29. If a matching address can be obtained, the value of the update reservation instructing bit in the register update reservation table 28, which corresponds to that address, is reset from "1" to "0".

As described above, if the update table 22 is referenced and the general-purpose register 26 is updated (if the update reservation instructing bit is "0"), the data in the general-purpose register 26 is input to the arithmetic unit 35. If the update reservation instructing bit is "1", the data in the general-purpose register 26 is not updated and cannot be used for the operations. Therefore, the data is input from the register update buffer 25 storing the data for updating the general-purpose register 26 to the arithmetic unit 35. If the instruction for updating the general-purpose register 26 is issued, the data is updated by the register update buffer 25 for the general-purpose register 26, so that the update reservation instructing bit in the corresponding entries in the reservation station 33 and the update table 22 is reset to "0". In this way, the logical configuration of the instruction controlling system can be simplified, and the number of logic stages can be reduced. Consequently, machine cycles can be made faster, and the clock frequency of the instruction controlling device 10 can be raised, so that the processing speed can be improved.

FIGS. 5A and 5B show the structures of the update table 22 and the reservation station 33.

FIG. 5A shows the structures of the update table 22. This figure shows the update buffer address table 29 including the entries 0 through 15, and the register update reservation table 28. The entries 0 through 15 correspond to general-purpose register addresses (general-purpose register numbers). The update buffer address table 29 is intended to respectively correspond the addresses in the register update buffer 25 to the general-purpose register addresses, and registers them. The register update reservation table 28 is intended to register the update reservation instructing bit indicating whether the corresponding address in the general-purpose register 26 is either updated or reserved. For example, if the update reservation bit is "0", it indicates that the corresponding general-purpose register 26 is updated. Therefore, the data is input from the general-purpose register 26 to the arithmetic unit 35. If the update reservation bit is "1", the update operation of the corresponding general-purpose register is reserved. Accordingly, the data is read from the register update buffer 25, and the data is input to the arithmetic unit 35.

Each entry in the update buffer address table 29 corresponds to each entry in the register update reservation table 28, and the entries are arranged by the number of general-purpose register addresses. In FIG. 5A, the numbers of the plurality of general-purpose registers to be arranged appear as the addresses of the plurality of general-purpose registers. However, a general-purpose register 26 may be configured by a memory, and addresses at which data are stored may be registered. Accordingly, the numbers of the plurality of general-purpose registers 26 have the same meaning as that of general-purpose register addresses.

FIG. 5B shows the structure of the reservation station 33. To the entries in the reservation station 33, a general-purpose register address, a register update buffer address, and an update reservation instructing bit are registered. At this time, both the register update buffer address and the update reservation instructing bit are corresponded to the general-purpose register address. If the value of the update reservation instructing bit in the update table 22 is "1", which is the case where the data must be read from the register update buffer 25 because the general-purpose register 26 is not updated, the corresponding entry in the update table 22 is registered as the entry in the reservation station 33.

Each entry in the reservation station 33 indicates that the instruction which desires to use the address of the entry is issued. The reservation station 33 is equipped with the capability for assigning priorities in order to precede and execute which entry by using a mechanism not shown in this figure. The addresses to be registered to the reservation station 33 are input to the reservation station 33 in the order that the instruction register 20 outputs the addresses according to a program. However, control is performed so that the addresses are executed starting from the address whose data becomes complete. This priority assigning capability corresponds to the out-of-order instruction control.

Figure 6A:
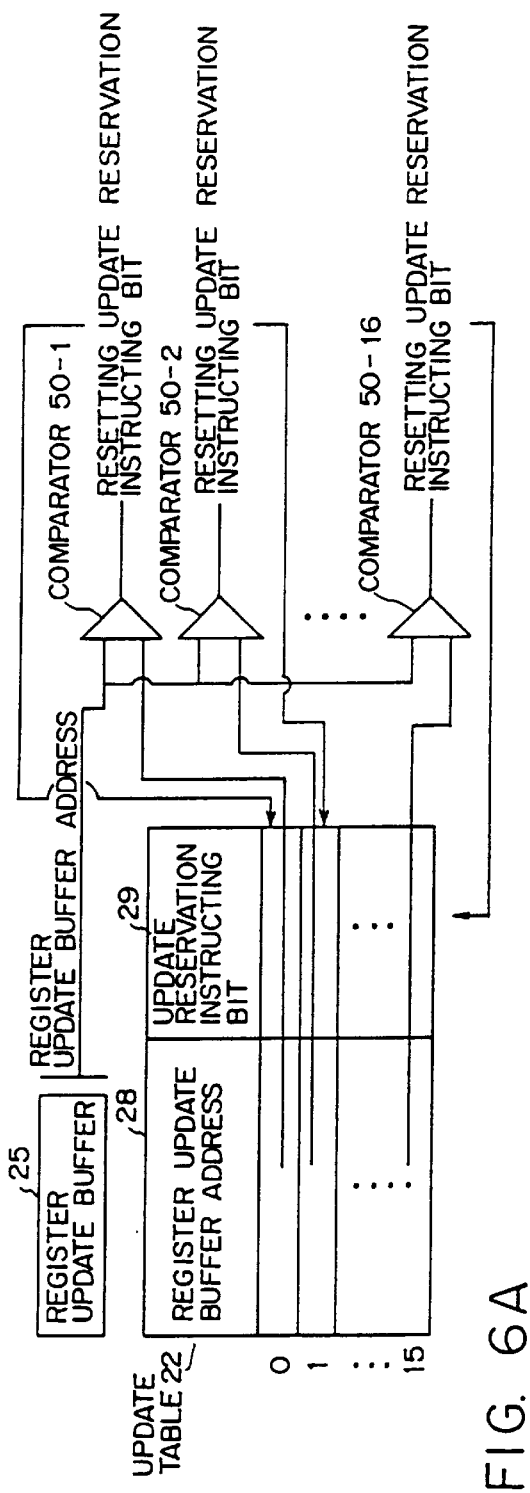
FIGS. 6A and 6B show the specific configurations of comparators shown in FIGS. 3 and 4.
Figure 6B:
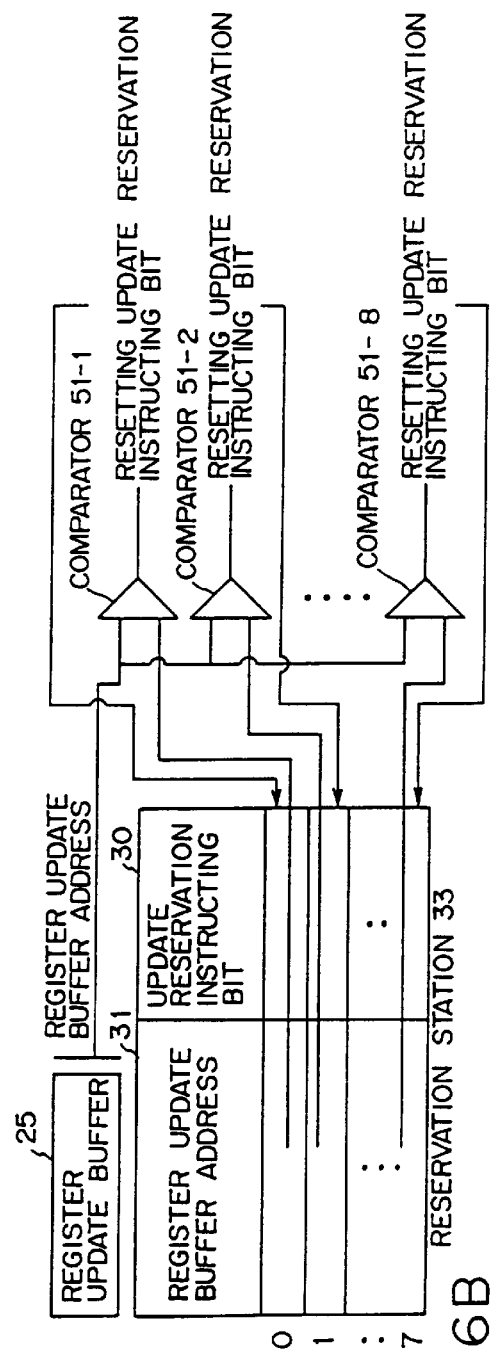

FIGS. 6A and 6B show the specific configurations of the comparators 23 and 24 shown in FIGS. 3 and 4.

FIG. 6A shows the configuration for resetting the update reservation instructing bit in the update table 22. Lines are connected in order to extract corresponding update buffer addresses from each of the entries 0 through 15 in the update buffer address table 29. The update buffer addresses corresponding to general-purpose register addresses are input to one of the terminals of the comparators 50-1 through 50-16. To the other of the terminals of the comparators 50-1 through 50-16, register update buffer addresses from the register update buffer 25 are respectively input. Since the register update buffer addresses transmitted from the register update buffer 25 are addresses whose data are updated from the general-purpose register to the general-purpose registers 26, the update reservation instructing bit in the register reservation table 28 must be updated.

With the configuration shown in FIG. 6A, the comparison between an update buffer address in the update buffer address table 29 and a register update buffer address from the register update buffer 25 is made, and the comparators 50-1 through 50-16 which find a match output a reset signal. The outputs of the comparators 50-1 through 50-16 are connected to the columns of the respectively corresponding update reservation instructing bits. If the reset signal is output from the comparators 50-1 through 50-16, the corresponding update reservation instructing bit is reset.

As described above, a plurality of comparators 50-1 through 50-16 are arranged, and each of the comparators makes the comparison between the update buffer address in each of the entries in the update buffer address table 29 and the register update buffer address transmitted from the register update buffer 25. As a result, the comparison process between each of the entries in the update buffer address and the register update buffer address can be performed in parallel, thereby quickly performing the comparison process, and quickly resetting the update reservation instruction bit.

FIG. 6B shows the configuration for resetting the update reservation instructing bit in each of the entries in the column 30 in the reservation station 33. This figure shows only the register update buffer address and the update reservation instructing bit in structure of the reservation station 33. Similar to FIG. 6A, lines for obtaining the register update buffer addresses in the respective entries 0 through 7 are connected to one of the terminals of the comparators 51-1 through 51-8. To the other of the terminals of the comparators 51-1 through 51-8, the register update buffer addresses from the register update buffer 25 are input. Each of the comparators 51-1 through 51-8 outputs a reset signal to the entry in the reservation station 33, which matches the register update buffer address, and resets the update reservation instructing bit in this entry. The outputs of the respective comparators 51-1 through 51-8 are connected to the update reservation instructing bits in the respective entries in the reservation station 33.

Similar to FIG. 6A, the comparison between the register update buffer address which is the output of the register update buffer 25 and the register update buffer address in each of the entries in the reservation station 33 is made in parallel processing, so that the update reservation instructing bit of the entry whose address matches the register update buffer address can be reset. As a result, the process can be performed at high speed.

Figure 7A:
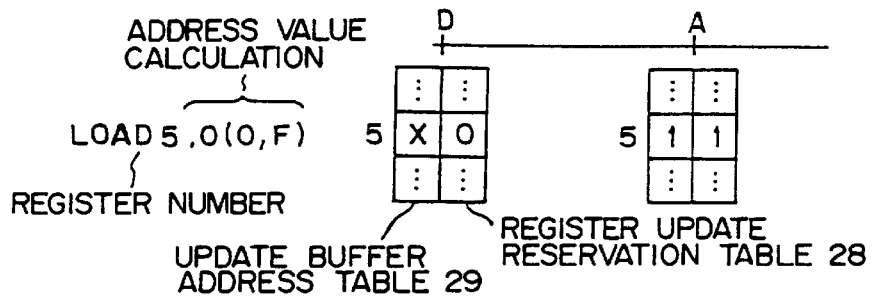
FIGS. 7A and 7B are schematic diagrams explaining the operations according to the embodiment when register interference does not occur.
Figure 7B:
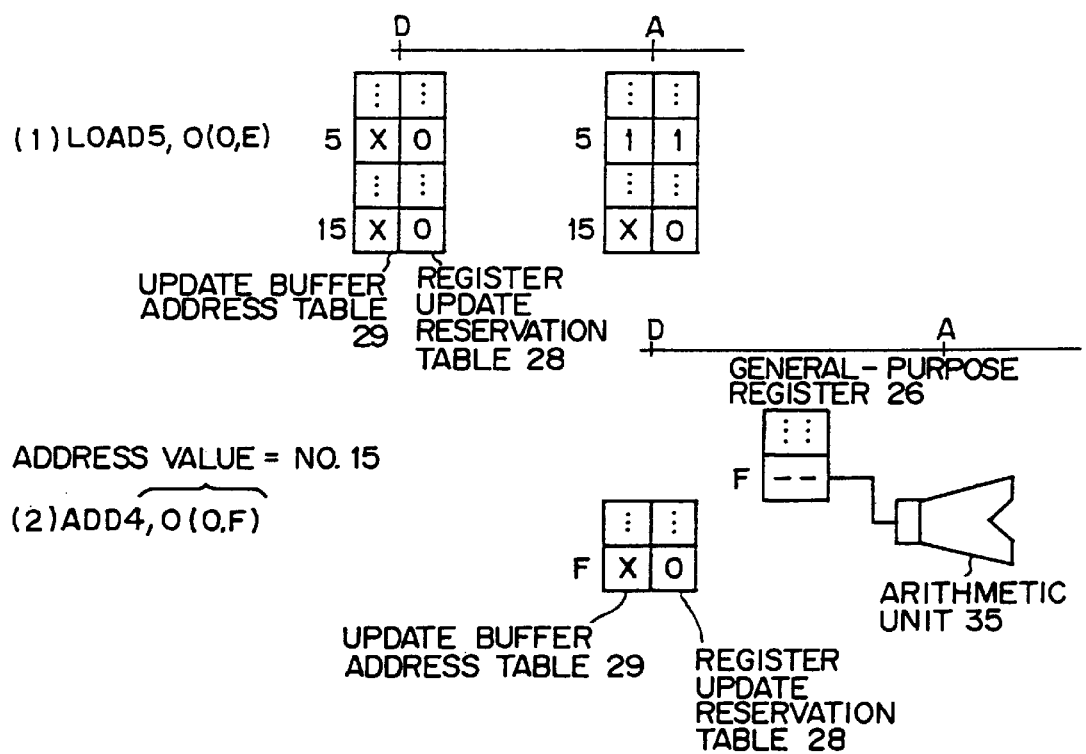

FIGS. 7A and 7B are schematic diagrams explaining the operations performed in this embodiment when no register interference occurs.

First of all, a LOAD instruction is executed as shown in FIG. 7A. This instruction updates No. 5 (the number or address of a general-purpose register) of the general-purpose registers 26. The "D" cycle (instruction decoding) of the LOAD instruction stores "X" (indicating the state in which a previously used address value of the register update buffer remains unchanged), and "0" are respectively stored in the entry No. 5 in the update buffer address table 29 and the register update reservation table 28. On the "A" cycle (address calculation of a main storage operand), "1" (an address in the register update buffer, which is assigned with a predetermined method, is registered. "1" is assumed to be registered here), and "1" (assigned as the update reservation instructing bit indicating a reservation instruction) are respectively stored in the entry No. 5 in the update buffer address table 29 and the register update reservation table 28. This means that the update operation of No. 5 of the general-purpose registers 26 is reserved, and its result is stored in the No. 1 (the number or address of a plurality of register update buffers, both of which have the same meaning) of the register update buffers 25.

For the instructions shown in FIG. 7B, the LOAD instruction in (1) is first executed. This instruction updates No. 5 of the general-purpose registers. On the "D" cycle of the LOAD instruction, "X" (used as the same meaning as that described above) and "0" are respectively included in the entries Nos. 5 and 15 of the update buffer address table 29 and the register update reservation table 28. On the "A" cycle (address calculation of a main storage operand), "1" (the address given with a predetermined method. Here, "1" is assumed for the sake of convenience) and "1" (reservation instruction) are respectively stored in the entry No. 5 of the update buffer address table 29 and the register update reservation table 28. "X" (used as the same meaning as that described above) and "O" remain unchanged in the entry No. 15 of the update buffer address table 29 and the register update reservation table 28. This is because No. 15 of the general-purpose registers 26 is not updated with the first instruction (LOAD instruction in (1)).

With the ADD instruction shown in (2) of FIG. 7B, the entry No. 15 in the register update reservation table 28 is referenced on "the" D cycle because a base register (used when an address of a main storage operand is calculated) is No. 15 of the general-purpose registers 26. Since its value is "0" (update unreservation) as a result of the reference operation, the data of No. 15 (represented as No. "F" in FIG. 7B) of the general-purpose registers 26 is read out and input to the arithmetic unit 35, which calculates the address of the main storage operand on the "A" cycle.

Figure 8:
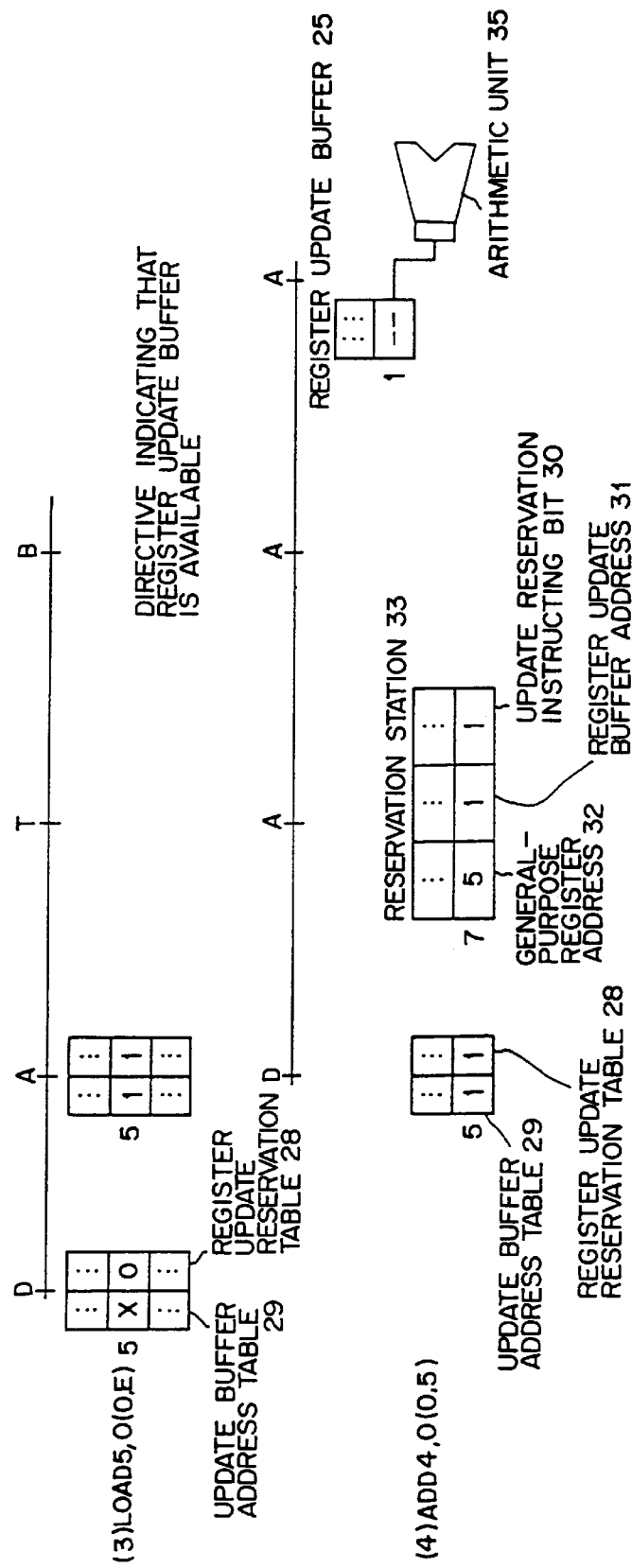
FIG. 8 is a schematic diagram explaining the operations according to the embodiment when two instructions cause register interference.

FIG. 8 is a schematic diagram explaining the operation performed in this embodiment when two instructions cause register interference.

For the instructions (causing register interference) shown in FIG. 8, the general-purpose register No. 5 is updated with the LOAD instruction in (3). On the "D" cycle of the LOAd instruction, "X" (having the same meaning as that used in FIGS. 7A and B) and "0" are respectively included in the entry No. 5 of the update buffer address table 29 and the register update reservation table 28. On the A cycle (address calculation of the main storage operand), "1" (assumed for the sake of convenience in the same manner as in FIGS. 7A and 7B) and "1" (reservation instruction) are respectively stored in the entry No. 5 of the update buffer address table 29 and the register update reservation table 28. Then, the "T" cycle (address conversion) and the B cycle (operand read) of the LOAD instruction are executed. On the B cycle, the result of the execution of the LOAD instruction is obtained. Consequently, the instruction that the register update buffer No. 1 is made available is output.

With the ADD instruction in (4), the entry No. 5 of the register update reservation table 28 is referenced on the "D" cycle because the base register (used for calculating the address of the main storage operand) is No. 5 of the general-purpose registers. Since its value is "1" (update reservation) as a result of the reference operation, "5", "1", and "1" are respectively stored in the entry No. 7 (assumed for the sake of convenience. Actually an available entry in the reservation station 33 is searched and used) as the general-purpose register address (having the same meaning as that of a general-purpose register number), the register update buffer address (having the same meaning as that of a register updated buffer number), and the update reservation instructing bit. The directive that the register update buffer 25 is available is issued during the execution of the previous LOAD instruction (the LOAD instruction in (3)), so that the reservation station 33 is referenced, and the entry No. 1 of the register update buffer 25 is read out and input to the arithmetic unit 35, which calculates the address of the main storage operand, on the next "A" cycle.

Figure 9:
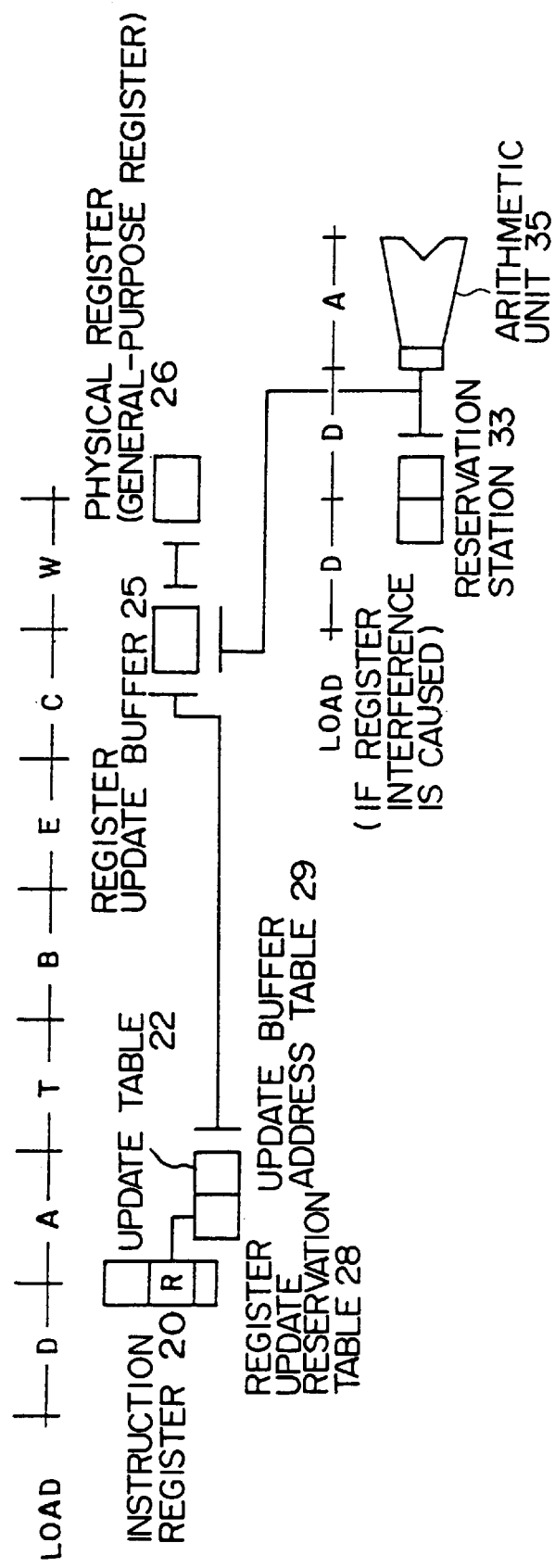
FIG. 9 is a schematic diagram explaining the operations according to the embodiment by referencing machine cycles.

FIG. 9 is a schematic diagram explaining the operations performed in this embodiment by referring to machine cycles.

This figure shows the case where two LOAD instructions cause register interference. As shown in FIG. 9, a logical address of the general-purpose register 26 is output from the instruction register 20 to the update table 22 on the "D" cycle when a first LOAD instruction is issued. Note that the decoder is omitted in this figure. In the update table 22, the update buffer address table 29 is referenced on the "A" cycle, and the update buffer address is provided from the instruction register 20 to the register update buffer 25 on the C cycle. At this time, the update reservation instructing bit corresponding to the update buffer address is set to "1" in the register update reservation table 28.

If the first LOAD instruction is an instruction for updating the physical register (general-purpose register) 26, the logical address of the general-purpose register 26 is output from the instruction register 20. This logical address is converted into an update buffer address by the update buffer address table 29 in the update table 22 via the decoder 21 which is not shown in this figure, and provided to the register update buffer 25. Then, the register update buffer 25 writes the corresponding address data to the corresponding address in the physical register 26, and updates the physical register 26 on the "W" cycle.

If the instruction causing the register interference (the second LOAD instruction in this case) is issued after the first LOAD instruction, the general-purpose register address is output from the instruction register 20 on the "D" cycle similar to the first LOAD instruction. Then, the update reservation instructing bit in the corresponding entry in the register update reservation table 28 is read out, and its value is proved to be "1" (since this is the case where the data which is the contents of the register update buffer written with the first LOAD instruction and is not updated in the physical register 26, is read, the value of the corresponding update reservation instructing bit is "1".) Because the update reservation instructing bit is "1", the contents of the update table 22 is registered to the reservation station 33, which assigns priorities to the contents transmitted from the update table 22, and sequentially outputs register update buffer addresses with the out-of-order method.

When the corresponding update buffer address is output from the reservation station 33 on the next "D" cycle, the corresponding data is input from the register update buffer 25 to the arithmetic unit 35, which performs an arithmetic operation.

Figure 1:
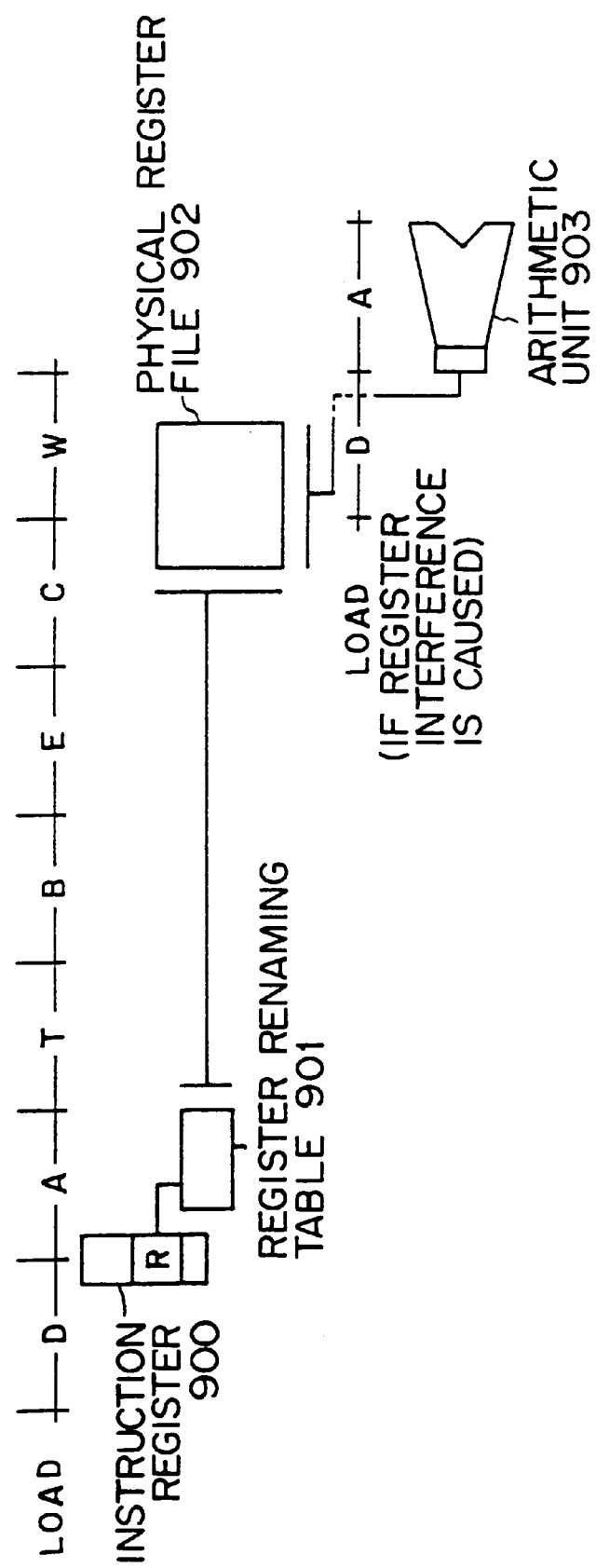
FIG. 1 is a schematic diagram showing a conventional register renaming technique.

If the conventional technique shown in FIG. 1 is compared with this embodiment shown in FIG. 9, two more D cycles are required for registering the contents of the update table 22 to the reservation station 33, and for outputting the data in the update buffer address after a priority is assigned, when the second LOAD instruction is executed. This means that the processing is delayed by one machine cycle according to this embodiment. However, the logical address must be renamed to the physical address with the conventional technique shown in FIG. 1, which leads to the complexity of the processing. Therefore, the "D" cycle of the second LOAD instruction will be caused to delay. Especially, when a program (such as an OS, etc.) which frequently causes register interference is executed, this machine cycle delay slows down the execution speed of the instruction controlling device.

In the meantime, the logic circuitry structuring the respective constituent elements can be simplified although one more machine cycles increases, according to this embodiment. Therefore, the frequency of the machine cycles of the instruction controlling device 10 can be raised (the execution speed of each stage of a pipeline can be improved), thereby speeding up the processing speed of the information processing device mounting the instruction controlling device 10 according to this embodiment.

As described above, the out-of-order instruction execution can be performed, and at the same time, the instructions can be quickly executed without delaying machine cycles even if register interference occurs, according to the present invention.

What is claimed is:

1. An instruction controlling system for performing out-of-order instruction control, comprising:

register registering data used for executing an instruction;

instruction register outputting a logical address of said register, which is used for executing the instruction;

decoding unit decoding the logical address output from said instruction register;

register update buffer temporarily storing the data to be registered to said register;

update table registering an address in said register update buffer, to which data for updating said register is registered, and an update reservation instructing bit indicating whether or not an update operation of contents of a corresponding address in said register according to the data registered to said register update buffer, is reserved, in correspondence with the address in said register; and reservation station registering the address in said register, the address in said register update buffer, and the update reservation instructing bit by making a correspondence between them, assigning priorities for executing corresponding instructions to entries corresponding to contents of each registration, and transmitting an address of data to be processed to said register update buffer, if the update operation of contents of said register is reserved, wherein:

when the instruction is executed, the update reservation instructing bit in said update table, which corresponds to the address output from said instruction register, is referenced;

an arithmetic operation is performed by using the data registered to said register if said register is updated; and the arithmetic operation is performed by using the data registered to said register update buffer if the update operation of said register is reserved.

2. The instruction controlling system according to claim 1, wherein:

if said register is updated according to the data stored in said register update buffer upon completion of the instruction, the data stored in said register update buffer is stored at the corresponding address in said register based on the address output from said update table, and at the same time, a corresponding update reservation instructing bit in said update table is reset.

3. The instruction controlling system according to claim 2, wherein:

if said register is updated according to the data stored in said register update buffer, the corresponding update reservation instructing bit in said reservation station is reset.

4. The instruction controlling system according to claim 3, wherein an entry in said reservation station, which corresponds to a reset update reservation instructing bit, is invalidated.

5. The instruction controlling system according to claim 4, wherein the invalidated entry in said reservation station is deleted.

6. An instruction controlling method for performing out-of-order instruction control, for which a register for registering data used for executing an instruction and a register update buffer for temporarily storing data to be registered to said register are arranged, comprising the steps of:

(a) registering an address in said register update buffer, to which data for updating said register is registered, and an update reservation instructing bit indicating whether or not an update operation of contents of a corresponding address in said register according to the data registered to said register update buffer, in correspondence with an address in said register;

(b) registering the address in said register, the address in said register update buffer, and the update reservation instructing bit by making a correspondence between them, assigning priorities for executing corresponding instructions to entries corresponding to contents of each registration, and transmitting address at which data to be processed are stored to said register update buffer based on assigned priorities, if the update operation of the contents of the address in said register is reserved; and (c) referencing the update reservation instructing bit corresponding to the address output when the instruction is executed, performing an arithmetic operation by using the data registered to said register if said register is updated, and performing the arithmetic operation by using the data stored in said register update buffer if the update operation of said register is reserved.

7. The instruction controlling method according to claim 6, further comprising the step of:

(d) storing the data stored in said register update buffer at a corresponding address in said register according to the contents of the registration made in step (a), and resetting a corresponding update reservation instructing bit, if an instruction for updating said register according to the data stored in said register update buffer is issued.

* * * * *